United States Patent [19]

Shin

[11] Patent Number: 5,498,403

[45] Date of Patent: Mar. 12, 1996

[54] METHOD FOR PREPARING HIGH DENSITY NICKEL HYDROXIDE USED FOR ALKALI RECHARGEABLE BATTERIES

[75] Inventor: Dong-Yup Shin, Kyunki, Rep. of Korea

[73] Assignee: Hyundai Motor Company, Rep. of Korea

[21] Appl. No.: 390,963

[22] Filed: Feb. 21, 1995

[30] Foreign Application Priority Data

May 20, 1994 [KR] Rep. of Korea .................. 94-11023

[51] Int. Cl.$^6$ .................................................. C01B 13/36
[52] U.S. Cl. .................. 423/592; 423/593; 423/594; 429/223
[58] Field of Search .................. 429/223; 423/592, 423/593, 594

[56] References Cited

U.S. PATENT DOCUMENTS

| | | | |
|---|---|---|---|
| 3,436,267 | 4/1969 | Faber | 423/592 |
| 4,390,447 | 6/1983 | Winsel et al | 423/592 |
| 5,281,494 | 1/1994 | Ettel et al. | 429/223 |
| 5,447,707 | 9/1995 | Babjak et al. | 423/592 |

FOREIGN PATENT DOCUMENTS

| | | | |
|---|---|---|---|
| 286724 | 11/1993 | Japan | 423/592 |
| 191855 | 7/1994 | Japan | 423/592 |
| 2061247 | 5/1981 | United Kingdom | 423/592 |

*Primary Examiner*—Wayne Langel
*Attorney, Agent, or Firm*—Finnegan, Henderson, Farabow, Garrett & Dunner

[57] ABSTRACT

A method for preparing nickel hydroxide is provided, in which a nickel sulfate solution and ammonium hydroxide are continuously mixed in a premixing vessel to form a nickel ammonium complex, and then the mixed solution and a sodium hydroxide solution are continuously supplied to a reactor. Included in the method of producing nickel hydroxide is the step of adding more than one element selected from the group consisting of Co, Zn and Cd to the nickel sulfate solution in a concentration range of 0.05–0.3 mol/L. The high density nickel hydroxide may be used for alkali rechargeable batteries.

11 Claims, 2 Drawing Sheets

METHOD FOR PREPARING HIGH DENSITY NICKEL HYDROXIDE USED FOR ALKALI RECHARGEABLE BATTERIES

BACKGROUND OF THE INVENTION

1. Field of the Invention

This invention relates to a method for preparing high density nickel hydroxide used for alkali rechargeable batteries. According to the invention, factors including pH are controlled while supplying nickel sulfate solution, sodium hydroxide solution and ammonium hydroxide, to produce the high density nickel hydroxide.

2. Description of the Related Art

Due to recent developments in the electronics industry, the demand for portable electronics such as wireless phones, camcorders, and portable computers has greatly increased. In accordance with this trend, the demand for batteries has likewise increased. As electronic devices are getting smaller and lighter with increasingly demanding performance requirements, a battery with high energy density and high capacity is needed. In response, great advances in the performance of Ni-Cd and lead acid batteries have been realized. However, as a result of cadmium and lead being known pollutants, environmental concerns have increased regulation on the use of these materials. Therefore, there is a significant need for the development of a pollution free rechargeable battery. An increase in the regulation of vehicle emissions has also increased the need for development of a pollution free vehicle.

Rechargeable batteries which meet these needs include Ni-MH (Metal Hydride) batteries, Ni-Fe batteries and Ni-Zn batteries. These batteries replace the cadmium negative electrode in a conventional Ni-Cd battery with Metal Hydride, Fe and Zn respectively. Since these batteries are pollution free and have higher theoretical capacities than Ni-Cd batteries, they are the current focus of research and development. Recently, a small size Ni-MH battery has been commercialized and is in the initial stages of mass production. However, other batteries have yet to be commercialized. A nickel hydroxide electrode which is used in the conventional Ni-Cd battery is also used as the positive electrode in these rechargeable batteries. The development of high capacity nickel hydroxide electrodes is a key to the future commercialization of these rechargeable batteries. The rechargeable battery using a conventional nickel hydroxide electrode mentioned above has a capacity lower than the capacity of a battery using the new electrode negative materials. In order to develop a high capacity battery resulting from use of the new negative materials, production technology of the active materials must coincide with advances in electrode fabrication technology.

The properties of nickel hydroxide used as an active material in a nickel hydroxide electrode differ depending on the production method. Generally, nickel hydroxide is produced using the neutralization method in which nickel salt and hydroxide salt are mixed and then a small amount of water is added. The precipitate particles are so coarse and their size distribution is so wide (ranging from 1 to hundreds of microns) that it is often only usable after being pulverized. The precipitate's irregular shape and low density render it inappropriate for use in a battery. When it is neutralized in solution, the rate of reaction is so fast that the precipitate is too fine and the density is too low, which requires longer filtering or washing times and increases the adsorption of water on the surface. As a result, it is difficult to load large amounts of active material on an electrode and it is therefore impossible to increase the electrode's capacity.

Nickel hydroxide used for pasted nickel hydroxide electrodes should be spherical, have high density, and have a narrow size distribution. Nickel hydroxide appropriate for a battery should have an apparent density of 1.4–1.7 g/cm$^3$, a tapping density of 1.8–2.1 g/cm$^3$, and a size range of 5–50 µm. Since the paste made with this kind nickel hydroxide has excellent fluidity and uniformity, it is possible to fabricate high capacity and uniform electrodes. The use of this kind of nickel hydroxide also improves the utilization of the active material and discharge capacity of the electrode.

In order to produce high density spherical nickel hydroxide, it should be grown gradually. Nickel ions first form complex ions with ammonia and then neutralize or raise the temperature of the solution, thus reducing and controlling the reaction rate so that nickel hydroxide is gradually precipitated by decomposition of the nickel ammonium complex. Nickel hydroxide precipitated in this manner has a high density, but it is difficult to control the reaction rate and particle size; the fluctuation of the composition and the deviation of the solution's pH during the reaction render its stable and continuous production difficult.

Electrode expansion is known to be the main cause of pasted nickel hydroxide electrode degradation. Such expansion occurs because β-NiOOH transforms into low density γ-NiOOH. This expansion breaks down the active material and degrades the conductivity of the electrode, which in turn rapidly decreases cycle life and capacity. The low density γ-NiOOH is characterized by an unstable crystal structure.

Protons do not transfer easily when high density nickel hydroxide is used. When charging at a constant current, a higher overpotential is needed near the end of the charge. The already charged β-NiOOH is constantly oxidized and transforms into low density γ-NiOOH having a higher level of oxidation. When the low density γ-NiOOH is formed, the active material's volume increases, resulting in the expansion of the electrode. As charge and discharge cycles are repeated, the electrode material breaks down due to changes in volume; conductivity significantly deteriorates and capacity abruptly decreases. High rates of charge and discharge exacerbate these problems.

It is reported that additives such as Co, Zn, Cd are effective to prevent formation of low density γ-NiOOH. Substitution of some of the Ni with these elements causes a distortion of the lattice which increases the mobility of protons during charge and discharge reactions in the positive electrode and decreases overvoltage reactions.

In this invention, by adding Co, Zn and Cd as active material additives to the nickel sulfate solution, high density nickel hydroxide containing Co, Zn, and Cd may produced, thus maximizing utilization of active material and preventing the expansion of the electrode. This method thereby produces a high capacity nickel hydroxide electrode.

Accordingly, it is an object of the present invention to provide a high density nickel hydroxide having excellent quality and which may be produced by the continuous supply of reactants and the continuous overflow of product. The high density nickel hydroxide of the invention is particularly useful for alkali rechargeable batteries.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

SUMMARY OF THE INVENTION

To achieve the objects and in accordance with the purpose of the invention, as embodied and broadly described herein, the invention comprises a method for preparing nickel hydroxide, in which a nickel sulfate solution and ammonium hydroxide are continuously mixed in a premixing vessel to form a nickel ammonium complex, and then the mixed solution and a sodium hydroxide solution are continuously supplied to a reactor. Included in the method of producing nickel hydroxide is adding more than one element selected from the group consisting of Co, Zn and Cd to the nickel sulfate solution in a concentration range of 0.05–0.3 mol/L.

In accordance with a preferred embodiment of the invention, the nickel hydroxide is coprecipitated with the additive element or elements.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate one embodiment of the invention and together with the description, serve to explain the principles of the invention.

(a: ×300, b: ×3,000)

DETAILED DESCRIPTION OF THE PREFERRED EMBODIMENTS

Figure 1:
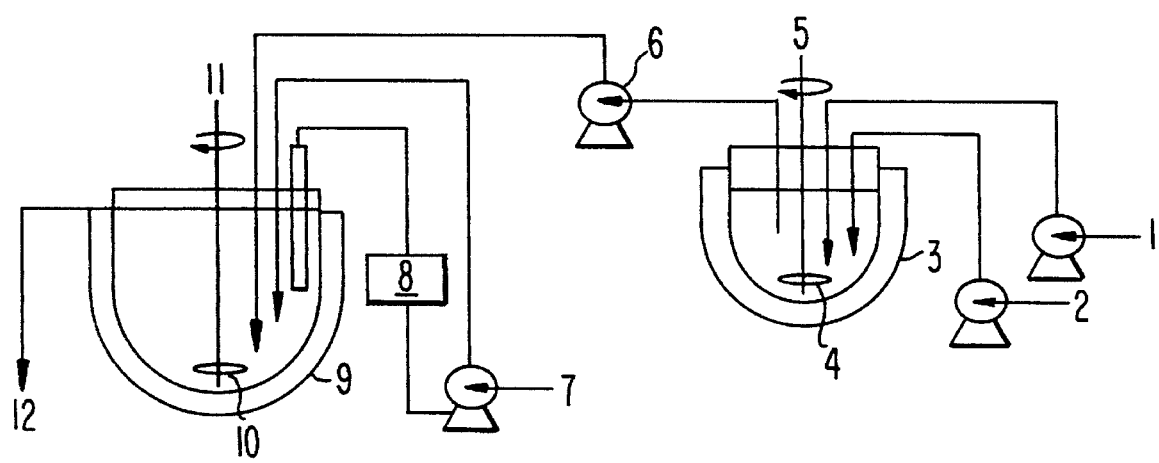
FIG. 1 illustrates a schematic diagram of a nickel hydroxide production apparatus.

FIG. 1 schematically depicts an apparatus used for the continuous production of high density nickel hydroxide used for alkali rechargeable batteries.

As here embodied, a nickel sulfate solution supply means 1 and an ammonium hydroxide supply means 2 continuously supply these materials to a premixing vessel 4 where they are mixed with an agitator 5. The premixing vessel 4 is maintained at a controlled temperature by water bath 3. A mixed solution supply means 6 and a sodium hydroxide supply means 7 supply these materials to reactor 10 and they are mixed with an agitator 11. The reactor 10 is also maintained at a controlled temperature by water bath 9. The sodium hydroxide solution supply means 7 is automatically controlled by pH controller 8. Then the solution and nickel hydroxide are continuously overflowed at 12.

It is desirable to maintain the temperatures of the premixing vessel 4 and reactor 10 between 35°–90° C. in order to control the reaction rate and stabilize the solutions. When the temperature is lower, ammonium complex salt may be precipitated in the premixing vessel and the reaction rate decreases in the reactor. When the temperature is higher, decomposition of ammonia is severe enough to cause the solution to be unstable.

Preferably, the pH of the solution in the reactor should be kept between 9–13 with a variation of ±0.1. Otherwise, the particles are too fine and the density is too low. The residence time of the solution in the reactor is preferred to be about 3 to 12 hours to control the particle size. The residence time is determined by the reactor volume and the flow rate of each solution. The concentration of the nickel sulfate solution is preferably kept between 1.0–3.2 mol/L and the concentration of the ammonium hydroxide is preferably kept between 6.0–16.0 mol/L. The concentration of the sodium hydroxide is kept between 2.0–10.0 mol/L, which is related to the concentration of nickel sulfate solution and affects the properties of nickel hydroxide. The flow rates of the nickel sulfate solution and the ammonium hydroxide are determined by the concentration of each solution and by the mole ratio of mixing—0.04–1.5 mol of ammonia per mol of nickel ion is preferred. When the ratio of mixing is too low, the ammonium complexing effect is negligible, otherwise the reaction rate is reduced to decrease the yield of reaction.

The flow rates of the mixed solution and the sodium hydroxide solution are determined by the residence time which, in turn, is related to the volume of the reactor, the concentration of each solution, and by the mole ratio of premixing. The flow rate of sodium hydroxide is automatically controlled by the pH controller to maintain a fixed pH value when the reaction reaches a steady state condition. The mole ratio of hydroxyl ions is 1.70–2.30 mol per mol of nickel ions, which is determined by the pH.

Co, Zn and Cd used as active material additives may be used, preferably, in a concentration of 0.05 to 0.3 mol/L.

The nickel hydroxide produced according to this invention is a high density powder having an apparent density in the range of 1.6–1.7 g/cm$^3$ and a tapping density in the range of 2.0–2.1 g/cm$^3$. It is capable of increasing the loading capacity, maximizing the utilization of active material by coprecipitation with various additives. It is useful as an active material for a nickel hydroxide electrode used in Ni-Cd, Ni-MH, Ni-Fe, and Ni-Zn rechargeable batteries.

The following are illustrative examples of the invention. The invention can be utilized in various ways and is not intended to be confined to the following examples.

EXAMPLE 1

1.5M nickel sulfate solution and 12M ammonium hydroxide in a ratio of 1.0 mol ammonia per 1.0M nickel ion were continuously mixed in a premixing vessel at 40° C. The mixed solution and 3.0M sodium hydroxide solution were then continuously fed in a reactor at 40° C. while maintaining the pH at 10. Nickel hydroxide was produced using a residence time of 3 hours. The properties of the nickel hydroxide were:

| | |
|---|---|
| Apparent density | 1.34 g/cm$^3$ |
| Tap density | 1.68 g/cm$^3$ |
| Particle size | 4–60 µm |
| Water adsorption, after drying | 4.2 wt % |
| Specific surface area | 44.3 m$^2$/g |

EXAMPLE 2

2.5M nickel sulfate solution and 15M ammonium hydroxide in a ratio of 1.0 mol ammonia per 1.0M nickel ion were continuously mixed in a premixing vessel at 40° C. The mixed solution and 5.0M sodium hydroxide solution were then continuously fed in a reactor at 60° C. while maintaining the pH at 10. Nickel hydroxide was produced using a residence time of 6 hours. The properties of the nickel hydroxide were:

| | |
|---|---|
| Apparent density | 1.51 g/cm³ |
| Tap density | 1.90 g/cm³ |
| Particle size | 6–80 μm |
| Water adsorption, after drying | 2.9 wt % |
| Specific surface area | 32.1 m²/g |

EXAMPLE 3

2.3M nickel sulfate solution and 15M ammonium hydroxide in a ratio of 0.7 mol ammonia per 1.0M nickel ion were continuously mixed in a premixing vessel at 40° C. The mixed solution and 6.0M sodium hydroxide solution were then continuously fed in a reactor at 60° C. while maintaining the pH at 11.5. Nickel hydroxide was produced using a residence time of 6 hours. The properties of the nickel hydroxide were:

| | |
|---|---|
| Apparent density | 1.61 g/cm³ |
| Tap density | 2.02 g/cm³ |
| Particle size | 5–60 μm |
| Water adsorption, after drying | 3.2 wt % |
| Specific surface area | 25.1 m²/g |

EXAMPLE 4

2.3M nickel sulfate solution and 15M ammonium hydroxide in a ratio of 0.5 mol ammonia per 1.0M nickel ion were continuously mixed in a premixing vessel at 50° C. The mixed solution and 6.0M sodium hydroxide solution were then continuously fed in a reactor at 50° C. while maintaining the pH at 11. Nickel hydroxide was produced using a residence time of 4 hours. The properties of the nickel hydroxide were:

| | |
|---|---|
| Apparent density | 1.73 g/cm³ |
| Tap density | 2.14 g/cm³ |
| Particle size | 2–50 μm |
| Water adsorption, after drying | 3.5 wt % |
| Specific surface area | 23.7 m²/g |

EXAMPLE 5

2.3M nickel sulfate solution and 15M ammonium hydroxide in a ratio of 0.6 mol ammonia per 1.0M nickel ion were continuously mixed in a premixing vessel at 50° C. The mixed solution and 6.0M sodium hydroxide solution were then continuously fed in a reactor at 50° C. while maintaining the pH at 11.5. Nickel hydroxide was produced using a residence time of 4 hours. The properties of the nickel hydroxide were:

| | |
|---|---|
| Apparent density | 1.68 g/cm³ |
| Tap density | 2.09 g/cm³ |
| Particle size | 2–40 μm |
| Water adsorption, after drying | 3.1 wt % |
| Specific surface area | 32.7 m2/g |

EXAMPLE 6

2.2M nickel sulfate solution containing 0.1M cobalt sulfate and 15M ammonium hydroxide in a ratio of 0.5 mol ammonia per 1.0M nickel ion were continuously mixed in a premixing vessel at 50° C. The mixed solution and 6.0M sodium hydroxide solution were then continuously fed in a reactor at 50° C. while maintaining the pH at 11. Nickel hydroxide was produced using a residence time of 4 hours. The properties of the nickel hydroxide were:

| | |
|---|---|
| Apparent density | 1.62 g/cm³ |
| Tap density | 2.05 g/cm³ |
| Particle size | 2–50 μm |
| Water adsorption, after drying | 3.8 wt % |
| Specific surface area | 30.3 m²/g |

EXAMPLE 7

2.2M nickel sulfate solution containing 0.1M zinc sulfate and 15M ammonium hydroxide in a ratio of 0.5 mol ammonia per 1.0M nickel ion were continuously mixed in a premixing vessel at 50° C. The mixed solution and 6.0M sodium hydroxide solution were then continuously fed in a reactor at 50° C. while maintaining the pH at 11. Nickel hydroxide was produced using a residence time of 4 hours. The properties of the nickel hydroxide were:

| | |
|---|---|
| Apparent density | 1.58 g/cm³ |
| Tap density | 2.01 g/cm³ |
| Particle size | 2–50 μm |
| Water adsorption, after drying | 4.1 wt % |
| Specific surface area | 28.1 m²/g |

EXAMPLE 8

2.2M nickel sulfate solution containing 0.5M cadmium sulfate and 15M ammonium hydroxide in a ratio of 0.8 mol ammonia per 1.0M nickel ion were continuously mixed in a premixing vessel at 50° C. The mixed solution and 6.0M sodium hydroxide solution were then continuously fed in a reactor at 50° C. while maintaining the pH at 11. Nickel hydroxide was produced using a residence time of 4 hours. The properties of the nickel hydroxide were:

| | |
|---|---|
| Apparent density | 1.79 g/cm³ |
| Tap density | 2.27 g/cm³ |
| Particle size | 1–9 μm |
| Water adsorption, after drying | 3.1 wt % |
| Specific surface area | 21.0 m²/g |

EXAMPLE 9

2.2M nickel sulfate solution containing 0.1M zinc sulfate and 0.1M cobalt sulfate and 15M ammonium hydroxide in a ratio of 0.5 mol ammonia per 1.0M nickel ion were continuously mixed in a premixing vessel at 50° C. The mixed solution and 6.0M sodium hydroxide solution were then continuously fed in a reactor at 50° C. while maintaining the pH at 11.5. Nickel hydroxide was produced using a residence time of 4 hours. The properties of the nickel hydroxide were:

| | |
|---|---|
| Apparent density | 1.67 g/cm³ |
| Tap density | 2.11 g/cm³ |
| Particle size | 2–50 μm |
| Water adsorption, after drying | 3.8 wt % |
| Specific surface area | 25.2 m²/g |

Figure 2B:
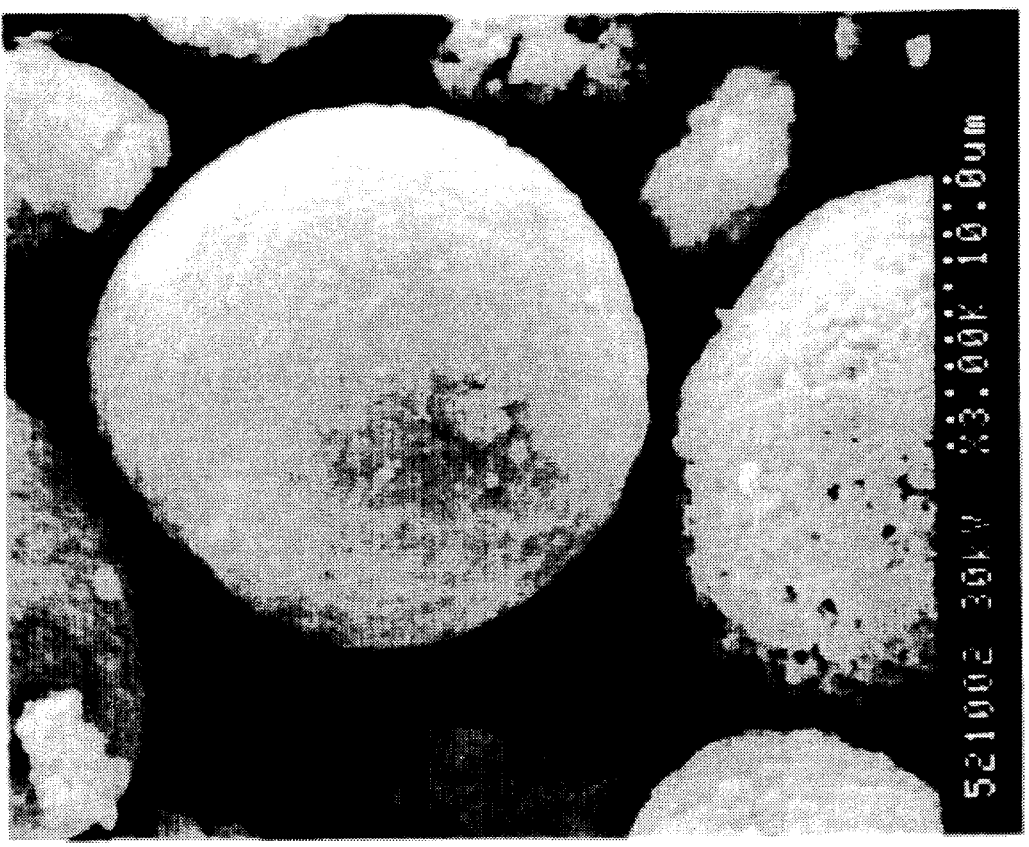
FIG. 2a and FIG. 2b are SEM micrographs of the morphology of nickel hydroxide precipitated at steady state conditions.
Figure 2A:
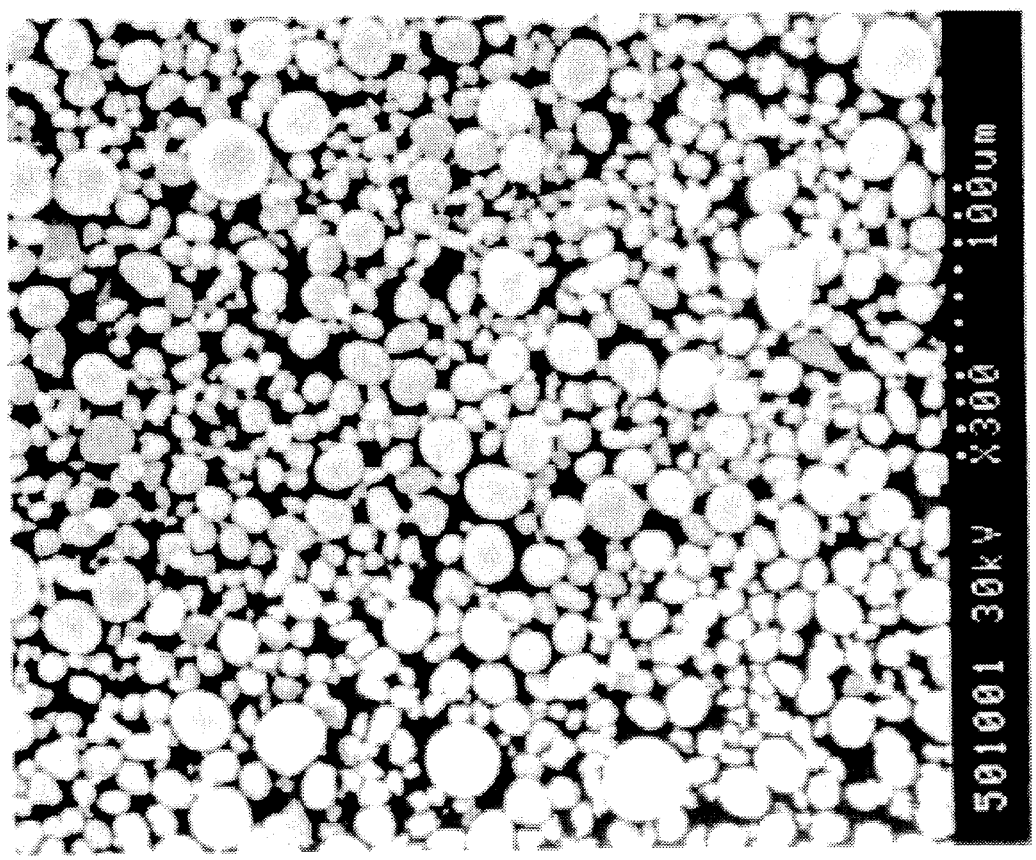

As shown by the above examples, the properties of high density nickel hydroxide produced according to the invention are superior to those of ordinary nickel hydroxide which typically has the following properties: an apparent density of 0.7–1.3 g/cm$^3$, a tapping density of 1.0–1.7 g/cc, particle sizes ranging from 1 to hundreds of microns, and a specific surface area of 40–80 m$^2$/g. FIGS. 2a and 2b are micrographs of the nickel hydroxide according to the invention; note the narrow size distribution and spherical shape.

What is claimed is:

1. A method for preparing high density nickel hydroxide in which a nickel sulfate solution and ammonium hydroxide are continuously mixed in a premixing vessel to form a mixed solution containing a nickel ammonium complex, and then the mixed solution containing the nickel ammonium complex and a sodium hydroxide solution are continuously supplied to a reactor to obtain nickel hydroxide.

2. The method for preparing high density nickel hydroxide according to claim 1, wherein one or more of the elements from the group consisting of Co, Zn and Cd are added to the nickel sulfate solution in a concentration of 0.05–0.3 mol/L.

3. The method for preparing high density nickel hydroxide according to claim 1, wherein the solutions are maintained at a temperature between 35°–90° C.

4. The method for preparing high density nickel hydroxide according to claim 1, wherein the solution in the reactor is maintained at a pH between 9–13 with a deviation of ±0.1.

5. The method for preparing high density nickel hydroxide according to claim 1, wherein the mean residence time of reaction is set between 3–12 hours.

6. The method for preparing high density nickel hydroxide according to claim 1, wherein the concentration of nickel in the nickel sulfate solution is in a range of 1.0–3.2 mol/L.

7. The method for preparing high density nickel hydroxide according to claim 1, wherein the concentration of ammonia in the ammonium hydroxide is in a range of 6.0–16 mol/L.

8. The method for preparing high density nickel hydroxide according to claim 1, wherein the concentration of sodium hydroxide is in a range of 2.0–10.0 mol/L.

9. The method for preparing high density nickel hydroxide according to claim 1, wherein the mole ratio of nickel sulfate solution and ammonium hydroxide is in a range of 0.04–1.5 mol of ammonia per mol of nickel ion.

10. The method for preparing high density nickel hydroxide according to claim 1, wherein the flow rate of the sodium hydroxide solution is automatically controlled by a pH controller to maintain the pH at a certain value when the reaction reaches a steady state condition, said pH controller thereby maintaining the mole ratio of hydroxyl ion at a value of 1.70–2.30 mol per mol of nickel ion.

11. The method for preparing high density nickel hydroxide according to claim 2, wherein the nickel hydroxide is coprecipitated with said added element or elements.

* * * * *